United States Patent [19]
Schröter

[11] 3,810,400
[45] May 14, 1974

[54] VARIABLE RATIO BRAKE OPERATING LEVER

[76] Inventor: Hans O. Schröter, Robert-Koch-Strasse 18, 8 Munich 22, Germany

[22] Filed: Feb. 12, 1973

[21] Appl. No.: 331,698

[30] Foreign Application Priority Data
Feb. 12, 1972 Germany.............................. 7205400

[52] U.S. Cl.................................... 74/518, 74/516
[51] Int. Cl............................................... G05g 1/04
[58] Field of Search...................... 74/516, 517, 518

[56] References Cited
UNITED STATES PATENTS
3,626,784 12/1971 Johnson ........................ 74/516 X
3,678,779 7/1972 Janosi .............................. 74/516

Primary Examiner—Samuel Scott
Assistant Examiner—Frank H. McKenzie, Jr.
Attorney, Agent, or Firm—Edmund M. Jaskiewicz

[57] ABSTRACT

A variable ratio operating lever for the brake system of a vehicle includes a pivotally mounted operating lever upon which is a roller which is engageable with a hyperbolic cam surface formed on a pivotally mounted control lever. A rod which is adapted to actuate the brake system is pivotally connected to the control lever. When the operating lever moves in the braking direction, its roller will roll along the hyperbolic cam surface to produce a predetermined variable ratio of force applied to the operating lever and the force acting on the actuating rod. This ratio attains a maximum when the roller engages the apex of the hyperbolic curve and this maximum ratio is maintained upon continued movement of the operating lever in the braking direction.

9 Claims, 2 Drawing Figures

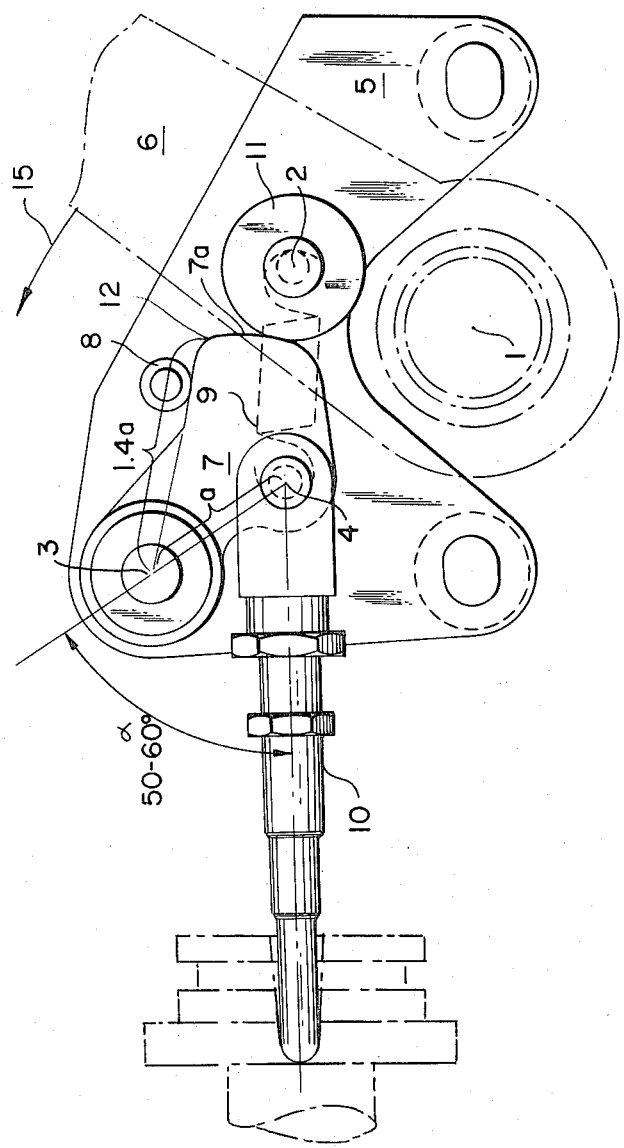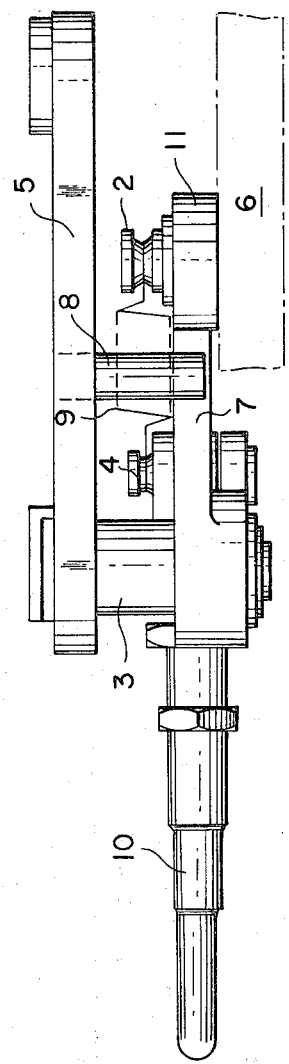
FIG. 1
FIG. 2

VARIABLE RATIO BRAKE OPERATING LEVER

The present invention relates to a mechanical hydraulic system for operating the brakes of a vehicle, more particularly, to the roller and cam operating connection between an operating lever and a control lever to achieve the optimum variable ratio between the force applied to the operating lever and the force acting on the actuating rod.

The hydraulic brake system of a motor vehicle is operated by a master cylinder whose piston is displaced by a rod, the end of which is pivotally connected to a pivotally mounted control lever. A pivotally mounted operating lever, which may be foot operated, applies a force to the control lever by a cam and roller arrangement. It is desirable that the force applied by the foot of the operator be mechanically amplified according to a predetermined varying ratio so that increasing force is applied to the actuating rod. In particular, it is desired that the force applied to the rod increase rapidly throughout a small initial movement of the operating lever to overcome any slack in the system. The force should then attain a maximum after play in the brake operator has been overcome and this ratio should then remain at the maximum in order to achieve the maximum brake effect in the hydraulic system.

While various forms of variable ratio brake operators have been proposed, such operators are generally unsatisfactory in that they occupy considerable space and require extensive modifications in the braking system of the vehicle for their installation. Such known operators also have the disadvantage that the piston of the master cylinder must move a substantial portion of its total piston travel in order to achieve the maximum braking effect.

In addition, known operators are relatively complex in structure and possess a relatively low mechanical efficiency since the number of parts required to coact against each other produces considerable friction which in turn decreases the mechanical efficiency. The existence of a relatively low mechanical efficiency does not enable one to obtain the larger ratio desired in the later phase of the braking operation by decreasing the travel in the initial phase of the braking operation.

A desirable characteristic of such variable ratio operators is that the effective ratio should be at least as large as the average ratio that corresponds to the relationship between the maximum pivoting travel of the operating foot pedal and the maximum travel of the piston rod of the master cylinder. This characteristic has not been attained in previously known operators.

It is therefore the principal object of the present invention to provide a novel and improved variable ratio operating lever for the brake system of a vehicle.

It is a further object of the present invention to provide a mechanical hydraulic brake operator which may be mounted on the brake system of vehicles without modifications thereof and which occupies a minimum of space.

It is a further object of the present invention to provide a simple and reliable mechanical hydraulic brake operator which varies the ratio between the travel of the operating lever and the displacement of the hydraulic piston in a predetermined manner so as to achieve effective braking.

According to one aspect of the present invention, there is provided a variable ratio operating lever for the brake system of a vehicle which comprises an actuating rod pivotally connected to a pivotally mounted control lever. The rod actuates the piston in the master cylinder of a hydraulic brake system. The control lever is provided with a convex hyperbolic shaped cam surface with one end of this surface terminating at an apex. A pivotally mounted operating lever is movable between release and braking positions and has a roller mounted thereon which engages the control lever at the other end of the hyperbolic cam surface in the release position of the operating lever. The roller rolls on the cam surface toward the pivot of the control lever and the apex of the cam surface when the operating lever moves from its release position in the braking direction. In the release position of the operating lever, the rod and a line extending through the pivot connection of the rod on the control lever and the pivot of the control lever defines an angle of 50°–60° which angle increases as the operating lever moves in the braking direction. The apex of the hyperbolic cam surface is so disposed on the control lever that the maximum force is exerted by the operating lever when its roller is at the apex. Further movement of the roller will be toward the pivot of the control lever.

A variable ratio brake operator embodying these features results in an optimum mechanical amplification and effective utilization of the distances traveled and forces applied by the brake cylinder and the operating lever. The ratio of distances traveled or the ratio of forces applied can be adapted as may be desired to the curve of the hydraulic pressure during the displacement of the piston.

Other objects and advantages of the present invention will be apparent upon reference to the accompanying description when taken in conjunction with the following drawings which are exemplary, wherein;

FIG. 1 is a side elevational view of the operator according to the present invention showing the components thereof in the release position; and FIG. 2 is a top plan view of the operator shown in FIG. 1.

Proceeding next to the drawings wherein like reference symbols indicate the same parts throughout the various views, a specific embodiment and modifications of the present invention will be described in detail.

An operating lever which in the present embodiment is a foot pedal 6 is pivotally mounted at a pivot connection 1 on a bracket or brake supporting structure which is not shown in the drawings. The operating lever 6 has journaled thereon a roller 11 that engages and rides upon an edge surface of a control lever 7 constructed as a cam lever. The control lever 7 is pivotally mounted at 3 on a frame member 5.

A piston rod 10 has one end in operative relationship with the piston of a master cylinder which is known in the art and hence not illustrated in the drawings. The other end of the rod 10 is pivotally connected to the control lever 7 at the pivot 4.

The control lever 7 and the other components are illustrated in the brake release position wherein the control lever 7 abuts onto a stop or abutment 8 that is fastened to the frame 5. The frame 5 can be bolted to a bracket which is not shown in the drawing and upon which there is mounted the pivot connection 1 for the foot pedal 6. A tension spring 9 which is placed under initial tension connects the pivotal pin 4 and the pin 2 for roller 11 on the foot pedal 6.

The control lever 7 has a convex or outwardly curved surface 7a upon which the roller 11 rolls and has the approximate shape of a hyperbola. The roller 11 is initially positioned in the release position of the operating lever at the outer end of an arm of the hyperbolic surface and moves along the cam surface 7a toward the pivot 3 of the control lever 7 when the operating lever 6 is actuated and moves in the braking direction as indicated by the arrow 15. The ratio, which is the relationship between the distance traveled by the operating lever 6 around its pivot 1 and the travel of the piston rod 10 or the relationship between the force exerted on the piston rod 10 and the force applied to the foot pedal 6 increases initially until the roller 11 reaches an apex 12 of the hyperbolic path 7a. The apex 12 is at the other end of the hyperbolic path from the release position of the roller 11. Further movement of the operating lever 6 and resultant further movement of the roller 11 along the control lever 7 will produce a substantially constant ratio.

The hyperbolic path 7a of the control lever is so constructed that for normally adjusted brakes the roller 11 will reach the apex 12 when the piston rod 10 is displaced a distance in the braking direction during which the hydraulic pressure in the master cylinder reaches the value required for the maximum braking effect. It is of course well known that the resistance to the actuation of a brake and therefore also the force of actuating the brake increase as the brake is moved in the braking direction. By measuring the curve of this force of resistance encountered during the movement of the piston rod in the braking direction, one thus determines the distance that the piston rod must travel in order to obtain the maximum hydraulic pressure when the brakes are normally adjusted.

The hyperbolic cam path 7a of the control lever 7 is shaped such that the travel of the piston rod 10 in order to obtain the maximum hydraulic pressure is produced with the smallest possible travel of the foot pedal 6 around its pivot point 1. The shape of the cam path 7a is also based upon the consideration that the force applied by the foot will increase in proportion to the hydraulic pressure, and accordingly the ratio will increase proportionally to the foot force.

The tension on the pretensioned spring 9 is increased during the initial portion of the movement of the operating lever 6 in the braking direction during which time the roller travels up to the apex 12 of the hyperbolic path. During this further tensioning of spring 9, the spring will exert a force which tends to restore the control lever to its release position against abutment 8. The prestressing of the tension spring prior to movement of the operating lever 6 in the braking direction will hold the operating lever 6 in its correct release position in which position the rod 10 will be pulled into the position as shown in FIG. 1 whereby the load is removed from the piston rod when the brake is in the release position. This removal of the load is required for satisfactory operation of the hydraulic master cylinder.

It is pointed out that the tension on spring 9 is increased only during the initial portion of the pivotal movement of the operating lever 6 in the braking direction. As a result, the work capacity of the spring can be relatively small and the resistance against operation of the foot pedal in the braking direction is reduced. However, in the later portion of the movement of the foot pedal in the braking direction, namely, that portion of the movement when the roller 11 has moved past the apex 12, tension will be reduced on the spring and the spring will thus exert a force which is supplemental to the force applied to the foot pedal 6. This supplemental spring force has the effect of improving the mechanical efficiency of the brake operator.

The installation of the brake operator of the present invention does not require any modification in the relative position of the master cylinder with respect to the foot pedal 6 nor is any modification of the foot pedal required since the roller 11 is mounted on the pin 2 to which a slightly lengthened piston rod 10 was previously attached in prior known structures.

The central axis of the piston rod 10 defines an angle of 50°–60° with a line passing through the pivotal connection 4 of the rod on the control lever 7 and the pivotal mount 3 of the control lever. This angle increases when the control lever is pivoted in the braking direction. The distance between the rod connection 4 on the control lever and the pivot 3 of the control lever is approximately equal to the maximum travel or displacement of the piston rod. As a result of these angular and dimensional relationships, the deflection of the piston rod in a vertical plane during its movement from the release to the braking position will be at a minimum and remain within permissible limits as set forth by the automobile industry.

The distance of apex 12 of the hyperbolic cam path 7a from pivot 3 is at least 1.4 times the distance between the pivot mount 3 and the pivot connection 4 designated as $a$. In spite of the fact that the position of pin 2 on foot pedal 6 and the position of the master hydraulic cylinder remained the same, the relationship between the travel of the foot pedal 6 around its pivot 1 and the travel of the piston rod, which relationship has been previously defined as the ratio, can thus be increased to at least 1.4 times the ratio which has been employed up to the present time in previously known operators. The maximum displacement of the piston rod remains unchanged since in the first portion of the movement of the foot pedal 6 up to the maximum hydraulic pressure a sufficient amount of travel of the foot pedal 6 around its pivot point is available for making possible this increase.

The roller and cam lever arrangement for the transmission of operating force from foot pedal 6 to the piston rod 10 can be modified as desired and adapted to the above mentioned conditions by changing the curve of the hyperbolic cam path 7a. The desired optimum mechanical amplification of the braking effect can thus always be obtained with the relatively simple structure of the present brake operator.

Upon mounting the frame 5 to the bracket upon which the foot pedal 6 is mounted, the piston rod 10, control lever 7, abutment 8 and foot pedal 6 will immediately be in the required positions with respect to each other and with respect to the master cylinder which positions are required for proper functioning of the brake operator. As a result, the possibility of malfunctioning of the brake operator because of improper assembly of the brake operator is avoided.

It is pointed out that the above described angular and dimensional relationships will be observed in those situations where the hydraulic ratio of the brake system for the piston travel in the master cylinder should not be modified in connection with employing the brake operator of the present invention. If these factors are to be modified for any reason other angular and dimensional relationships can be worked out.

The tension spring between the pivot of the roller and the pin connecting the control lever and the piston rod prevents excessive wear of the roller and cam lever train because of vibration and relative movement therebetween.

Thus it can be seen that the brake operator according to the present invention provides an optimum mechanical amplification and use of the travel and force of operation since the ratio can be adapted as may be desired to the curve of the hydraulic pressure during the travel of the piston during the braking action. The adaptation of the increase in ratio to the curve of the hydraulic pressure during this travel of the piston enables the most effective utilization of the distance of travel of the foot pedal in the braking operation. The distance through which the foot pedal pivots to attain the maximum braking effect is a relatively small amount of the total distance through which the brake pedal can be moved during the braking operation. Indeed, the travel of the brake pedal to the maximum braking effect is so small that the mechanical amplification of the force applied to the brake pedal can be increased without any reduction in the total travel of the piston of the master cylinder. Further, the maximum braking effect can always be attained even when the brakes are adjusted so as to have a relatively large play or clearance before the braking effect actually occurs. As a result, the functioning of the present brake operator is independent of the adjustment of the brakes.

The disclosed roller and cam lever force transmitting arrangement readily enables a variation of the ratio as may be desired. The operator requires a minimum of space in length, width and heighth so that the brake system and in particular, the relationship of the foot pedal to the master cylinder need not be modified to permit use of this brake operator. This is of considerable economic significance since the use of this brake operator does not necessitate increased manufacturing cost of a vehicle, other than those incurred by the installation of this operator.

The brake effect or action can be well regulated or controlled since it is possible to permit the ratio to increase in proportion to the force applied by the foot to the brake pedal and, in particular to utilize a brake effect in which the ratio which becomes effective immediately after the play in the brakes has been overcome is at least as large as the relationship between the maximum pivoting distance or travel of the foot pedal and the maximum displacement of the piston rod. In addition, the relatively simple and inexpensive structure of the present brake operator permits reliable operation under long and continuous use and entails relatively low cost of manufacture.

It will be understood that this invention is susceptible to modification in order to adapt it to different usages and conditions, and accordingly, it is desired to comprehend such modifications within this invention as may fall within the scope of the appended claims.

What is claimed is:

1. A variable ratio operating lever system for the brake system of a vehicle comprising a rod adapted to actuate the brake system, a pivotally mounted control lever and said rod pivotally connected to said control lever, said control lever having a convex hyperbolic shaped cam surface with one end thereof terminating at an apex, a pivotally mounted operating lever movable between release and braking positions, a roller on said operating lever engaging said control lever cam at the other end of said hyperbolic cam surface in the release position of said operating lever and rolling on said hyperbolic surface toward the pivot of the control lever and said apex when the operating lever moves in the braking direction, said rod and a line through the pivot connection of said rod on said control lever and the pivot of said control lever defining an angle of 50-60 degrees in the release position of said operating lever which angle increases as the operating lever moves in the braking direction, the apex of the hyperbolic cam surface being so disposed on said control lever that the maximum force is exerted by the operating lever when its roller is at said apex and further movement of the roller is toward the pivot of said control lever.

2. A variable ratio operating lever system as claimed in claim 1 wherein one end of said rod is pivotally connected to said control lever.

3. A variable ratio operating lever system as claimed in claim 1 wherein the distance between said apex and said pivot of the control lever is greater than the distance between the pivot connection of said rod on said control lever and said pivot of the control lever.

4. A variable ratio operating lever system as claimed in claim 3 wherein said system is hydraulic and said rod displaces the piston of the master cylinder of the hydraulic brake system, said distance between the pivot connection of said rod on said control lever is substantially equal to the maximum travel of the piston in said master cylinder.

5. A variable ratio operating lever system as claimed in claim 3 wherein said first distance is 1.4 times the second distance.

6. A variable ratio operating lever system as claimed in claim 1 wherein said system is hydraulic and said rod displaces the piston of the master cylinder of the hydraulic brake system.

7. A variable ratio operating lever system as claimed in claim 1 and comprising a tension spring connecting the pivot mount of said roller with the pivot connection of said rod on said control lever.

8. A variable ratio operating lever system as claimed in claim 1 and comprising abutment means engageable by said control lever in the release position thereof.

9. A variable ratio operating lever system as claimed in claim 8 and comprising a frame upon which said control lever is pivotally mounted and said abutment is mounted, said frame being mounted on a bracket of said operating lever.

* * * * *